United States Patent
Shibano

(10) Patent No.: US 8,413,695 B2
(45) Date of Patent: Apr. 9, 2013

(54) HEAVY DUTY TIRE WITH TREAD HAVING CLOSED END SIPES AND SHALLOW AXIAL GROOVES

(75) Inventor: Keizo Shibano, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 592 days.

(21) Appl. No.: 12/632,460

(22) Filed: Dec. 7, 2009

(65) Prior Publication Data

US 2010/0200138 A1  Aug. 12, 2010

(30) Foreign Application Priority Data

Feb. 6, 2009 (JP) ................................. 2009-026451

(51) Int. Cl.
*B60C 11/04* (2006.01)
*B60C 11/12* (2006.01)

(52) U.S. Cl. ......... 152/209.17; 152/209.21; 152/209.22; 152/901; 152/DIG. 3

(58) Field of Classification Search ............. 152/209.17, 152/209.18, 209.21, 209.22, 901, DIG. 3
See application file for complete search history.

(56) References Cited

U.S. PATENT DOCUMENTS

| | | | | |
|---|---|---|---|---|
| 3,332,465 | A * | 7/1967 | French ...................... | 152/DIG. 3 |
| 4,884,606 | A * | 12/1989 | Matsuda et al. ......... | 152/DIG. 3 |
| 7,954,527 | B2 * | 6/2011 | Ohara ...................... | 152/DIG. 3 |
| 2005/0230020 | A1 * | 10/2005 | Miyake .................... | 152/209.18 |
| 2007/0151646 | A1 | 7/2007 | Ito | |
| 2009/0090445 | A1 * | 4/2009 | Itou .......................... | 152/209.18 |
| 2010/0096055 | A1 * | 4/2010 | Shibano .................. | 152/209.25 |

FOREIGN PATENT DOCUMENTS

| | | | |
|---|---|---|---|
| JP | 04-087808 A | * | 3/1992 |
| JP | 08-048114 A | * | 2/1996 |
| JP | 2002-046426 A | * | 2/2002 |
| JP | 2004-306872 A | * | 11/2004 |
| JP | 2008-049958 A | * | 3/2008 |

OTHER PUBLICATIONS

Machine translation for Japan 2008-049958 (no date).*
Machine translation for Japan 2004-306872 (no date).*
Machine translation for Japan 2002-046426 (no date).*
Machine translation for Japan 08-048114 (no date).*

* cited by examiner

*Primary Examiner* — Steven D Maki

(74) *Attorney, Agent, or Firm* — Birch, Stewart, Kolasch & Birch, LLP

(57) ABSTRACT

A heavy duty tire comprises a tread portion provided with a center rib, shoulder ribs and middle ribs therebetween. The middle ribs are provided with closed-end sipes. The sipe comprises: an axially inner segment and axially outer segment inclined at an angle of from 30 to 60 degrees with respect to the tire circumferential direction; and a middle segment therebetween inclined in a direction crosswise to the axially inner and outer segments. The angle $\beta 1$ between the axially inner segment and middle segment is from 90 to 110 degrees. The angle $\beta 2$ between the axially outer segment and middle segment is from 90 to 110 degrees. The axial length SW of the closed-end sipe measured from the axially inner end to the axially outer end thereof is from 0.50 to 0.90 times the axial width LW of the middle rib.

7 Claims, 7 Drawing Sheets

HEAVY DUTY TIRE WITH TREAD HAVING CLOSED END SIPES AND SHALLOW AXIAL GROOVES

BACKGROUND OF THE INVENTION

The present invention relates to a pneumatic tire, more particularly to a heavy duty tire provided with a five-rib tread pattern.

In a pneumatic tire for heavy duty vehicles such as tractor head, trailer and the like, the most widely adopted are five-rib tread patterns.

In such a five-rib tread pattern, usually the ground pressure of a center rib becomes high and the rigidity of axially outermost shoulder ribs is large. Therefore, there is a tendency that the ground pressure of middle ribs positioned between the center rib and shoulder ribs becomes uneven, and moreover the uneven ground pressure distribution is varied during running and also by the service conditions. As a result, so called rib punching wear—a phenomenon such that the middle ribs rapidly wear more than the center rib and shoulder ribs—is liable to occur. Especially, in the case that the middle ribs are provided with sipes for improving wet performance, rib punching wear is liable to begin at the sipes.

SUMMARY OF THE INVENTION

It is therefore, an object of the present invention to provide a heavy duty tire in which, although the middle ribs is provided with sipes, rib punching wear of the middle ribs can be effectively prevented, and thus wet performance can be improved at the same time.

According to the present invention, a heavy duty tire comprises a tread portion provided with four straight main grooves extending continuously in the tire circumferential direction so as to form a center rib extending along the tire equator, a pair of axially outermost shoulder ribs, and a pair of middle ribs between the center rib and shoulder ribs, and each of the middle ribs provided with a plurality of closed-end sipes whose ends are terminated within the middle rib and arranged at intervals in the tire circumferential direction, wherein the closed-end sipes each comprise an axially inner segment extending axially outwardly from the axially inner end of the closed-end sipe while inclining at an angle of from 30 to 60 degrees with respect to the tire circumferential direction, an axially outer segment extending axially inwardly from the axially outer end of the closed-end sipe while inclining at an angle of from 30 to 60 degrees with respect to the tire circumferential direction in the same inclining direction as the axially inner segment, and a middle segment extending between an axially outer end of the axially inner segment and an axially inner end of the axially outer segment, while inclining in a direction crosswise to the axially inner and outer segments, wherein the angle β1 between the axially inner segment and middle segment is not less than 90 degrees and not more than 110 degrees, the angle β2 between the axially outer segment and middle segment is not less than 90 degrees and not more than 110 degrees, and an axial length SW of the closed-end sipe measured from the axially inner end to the axially outer end thereof is not less than 0.50 times but not more than 0.90 times the axial width LW of the middle rib.

In the following description, various dimensions, positions and the like refer to those under a normally inflated unloaded condition of the tire unless otherwise noted.

Ground contacting width TW is the axial distance between the tread edges E measured in the normally inflated unloaded condition of the tire.

The tread edges E are the axial outermost edges of the ground contacting patch (camber angle=0) in a normally inflated loaded condition.

The normally inflated unloaded condition is such that the tire is mounted on a standard wheel rim and inflate to a standard pressure but loaded with no tire load.

The normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

DESCRIPTION OF THE PREFERRED EMBODIMENTS

Embodiments of the present invention will now be described in detail in conjunction with accompanying drawings.

The heavy duty tire 1 according to the present invention comprises, as usual, a tread portion 2, a pair of axially spaced bead portions each with a bead core therein, a pair of sidewall portions extending between the tread edges E and the bead portions, a carcass extending between the bead portions, and a tread reinforcing belt disposed radially outside the carcass in the tread portion.

Figure 1:
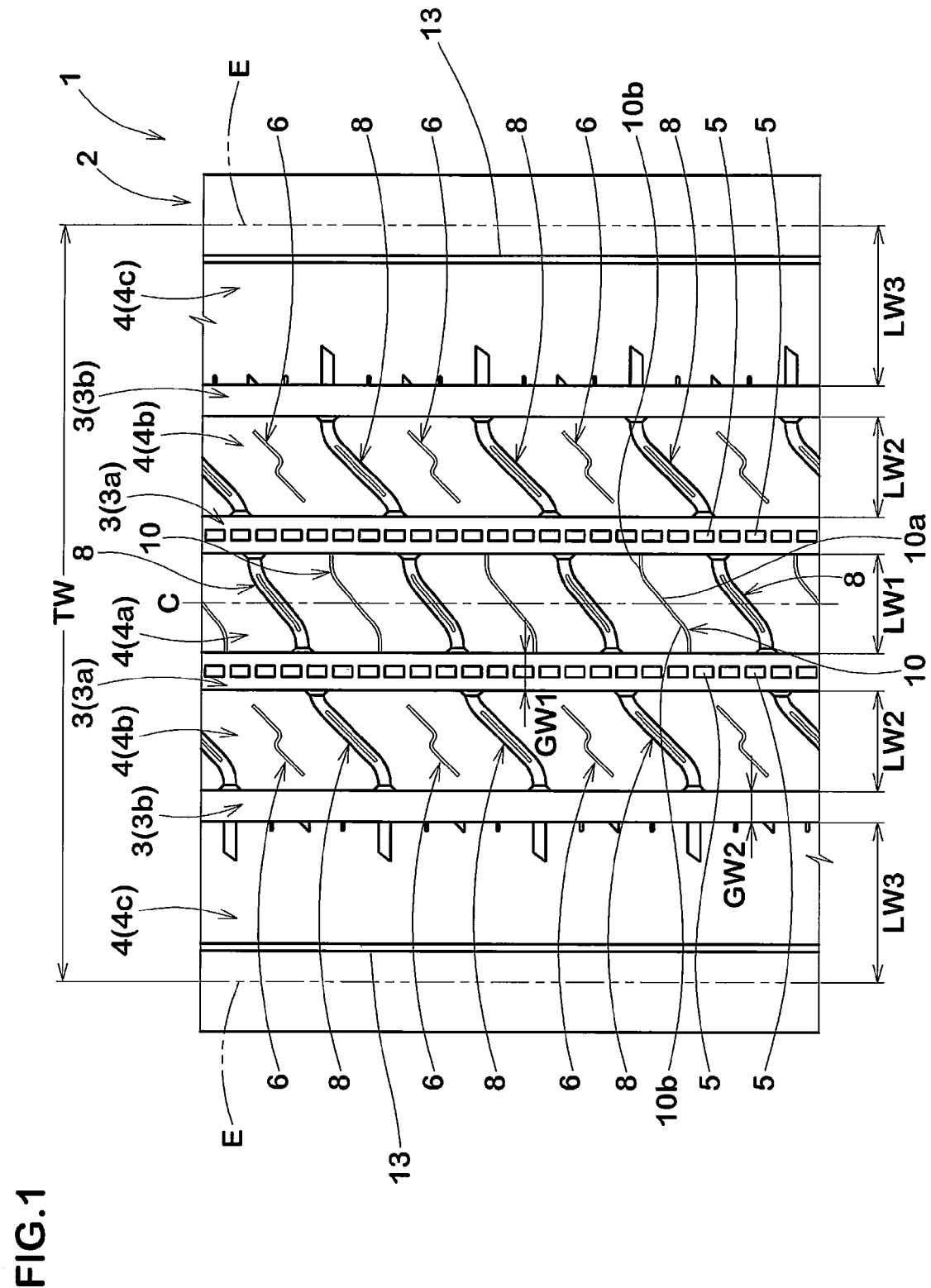
FIG. 1 is a developed partial view of a tread portion of a heavy duty tire according to the present invention showing a tread pattern.
Figure 2:
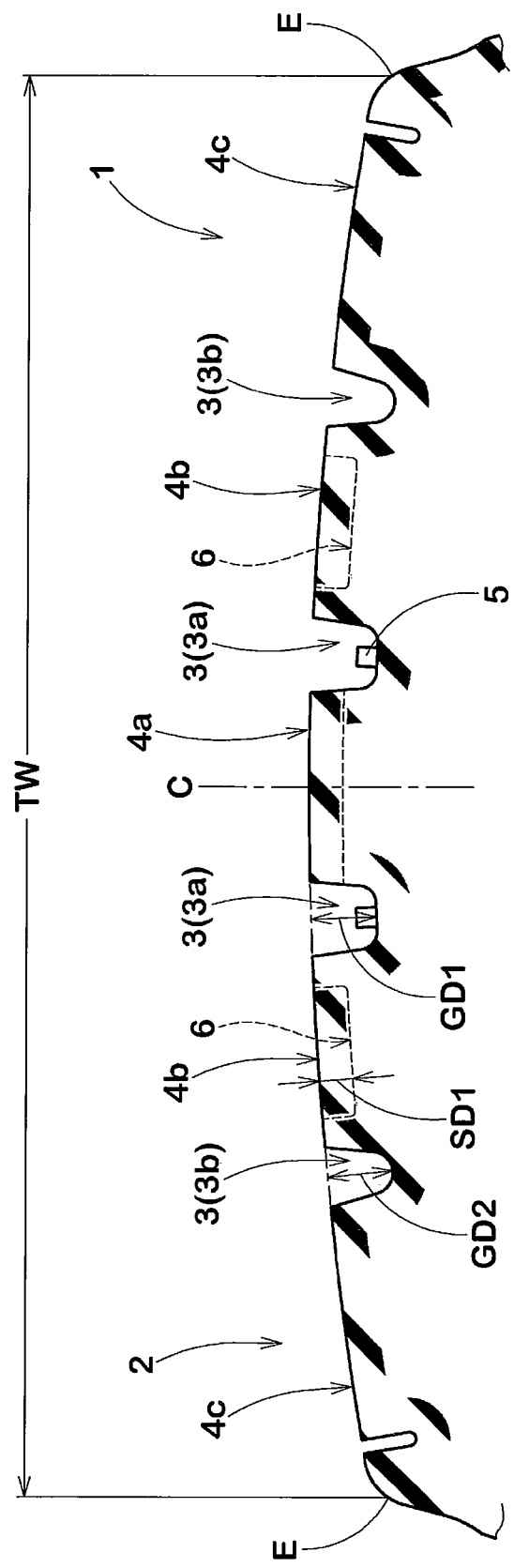
FIG. 2 is a cross sectional view of the tread portion.

The tread portion 2 is provided with four straight main grooves 3 extending continuously in the tire circumferential direction as shown in FIG. 1. Thereby, the tread portion 2 is divided into five ribs 4 extending continuously in the tire circumferential direction.

In this invention, if a rib is crossed by an axial groove having a depth of less than 5 mm and a width of less than 30% of the width of the adjacent main groove 3, then the rib is described as being continuous because such a rib is considered as still having continuity in view of the thick tread rubber and deep main groove.

In this embodiment, the tread portion 2 is not provided with an axial groove having a depth of 5.0 mm or more and a width of 30% or more of the width GW1, GW2 of the main groove 3.

The main grooves 3 include: a pair of center main grooves 3a disposed one on each side of the tire equator C; and a pair of shoulder main grooves 3b disposed between the center main grooves 3a and ground contact edges E.

In this embodiment, the main grooves 3 on one side of the tire equator C and the main grooves 3 on other side of the tire equator C are disposed substantially symmetrical positions about the tire equator C.

The pair of center main grooves 3a extending in the tread crown region where the ground pressure becomes relatively high are each provided in the groove bottom thereof with a plurality of independent protrusions 5 arranged at intervals along the length of the groove in order to prevent stone entrapment. The height of the protrusion 5 is ¼ to ⅓ times the depth of the main groove 3a, and the axial width is about ⅓ of the width of the main groove 3a.

The pair of shoulder main grooves 3b can be provided with protrusions 5, but in this example, the protrusions 5 are not provided.

The widths GW1 and GW2 of the main grooves 3a and 3b are preferably set in a range of not less than 4.0%, more preferably not less than 4.5%, but not more than 7.0%, more preferably not more than 5.5% of the ground contacting width TW, and the depths GD1 and GD2 of the main grooves 3a and 3b are preferably set in a range of not less than 4.5%, more preferably not less than 5.0%, but not more than 9.5%, more preferably not more than 8.5% of the ground contacting width TW in order to achieve the drainage performance, durability and wear resistance in a well balanced manner.

Accordingly, the ribs 4 include: a center rib 4a between the pair of center main grooves 3a; a pair of middle ribs 4b between the center main grooves 3a and shoulder main grooves 3b; and a pair of shoulder ribs 4c between the shoulder main grooves 3b and ground contact edges E.

The widthwise center of the center rib 4a is substantially coincide with the tire equator C.

The middle rib 4b and shoulder rib 4c on one side of the tire equator C and those on the other side are disposed symmetrically about the tire equator c.

In order to provide necessary rigidity in the tire axial direction and wet performance, the widths LW1, LW2 and LW3 of the ribs 4a, 4b and 4c, respectively, are preferably set in a range of not less than 10%, more preferably not less than 12%, but not more than 18%, more preferably not more than 15% of the ground contacting width TW.

Figure 3:
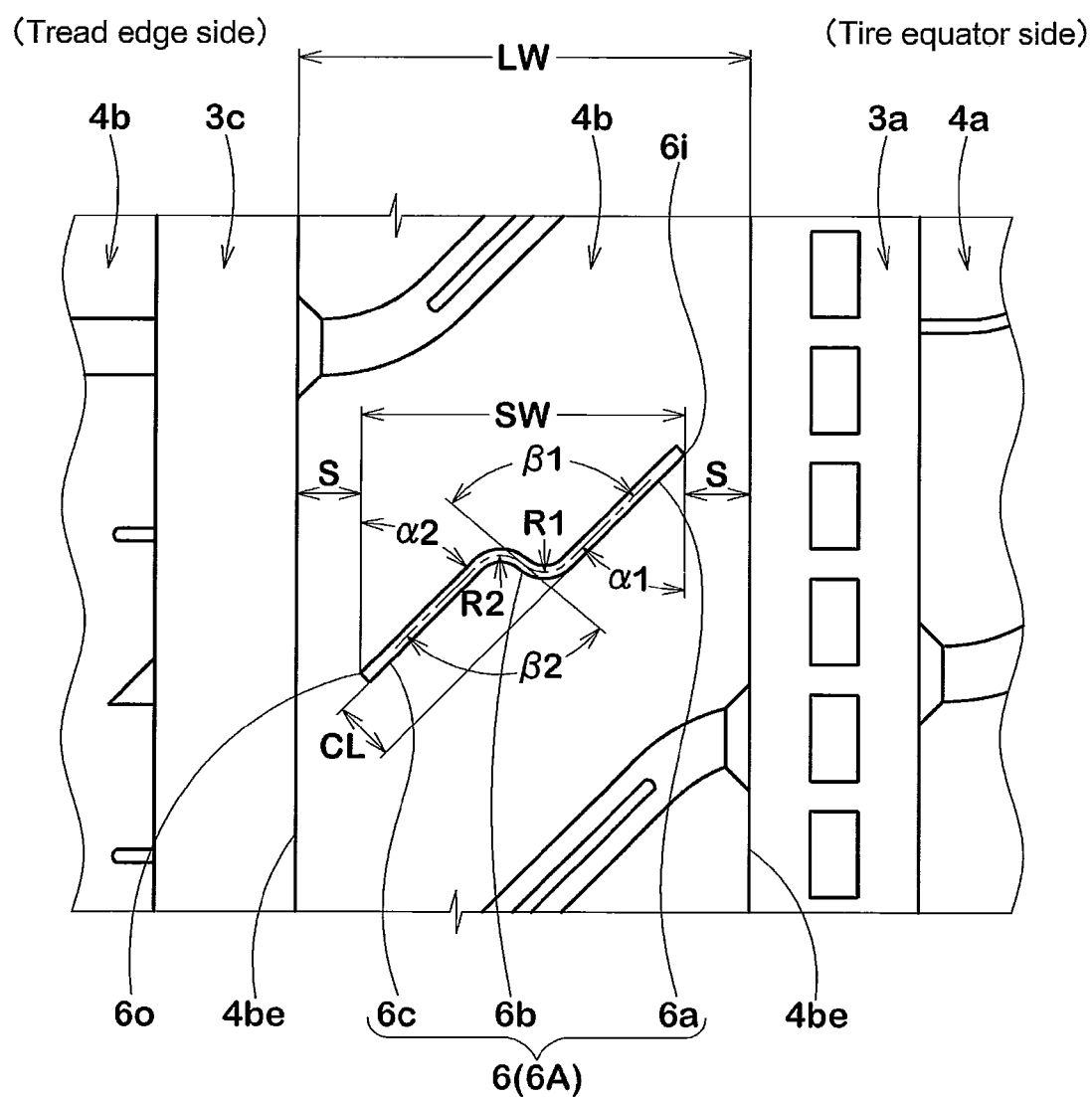
FIG. 3 is an enlarged partial view of the left-side middle rib showing a closed-end sipe.
Figure 4:
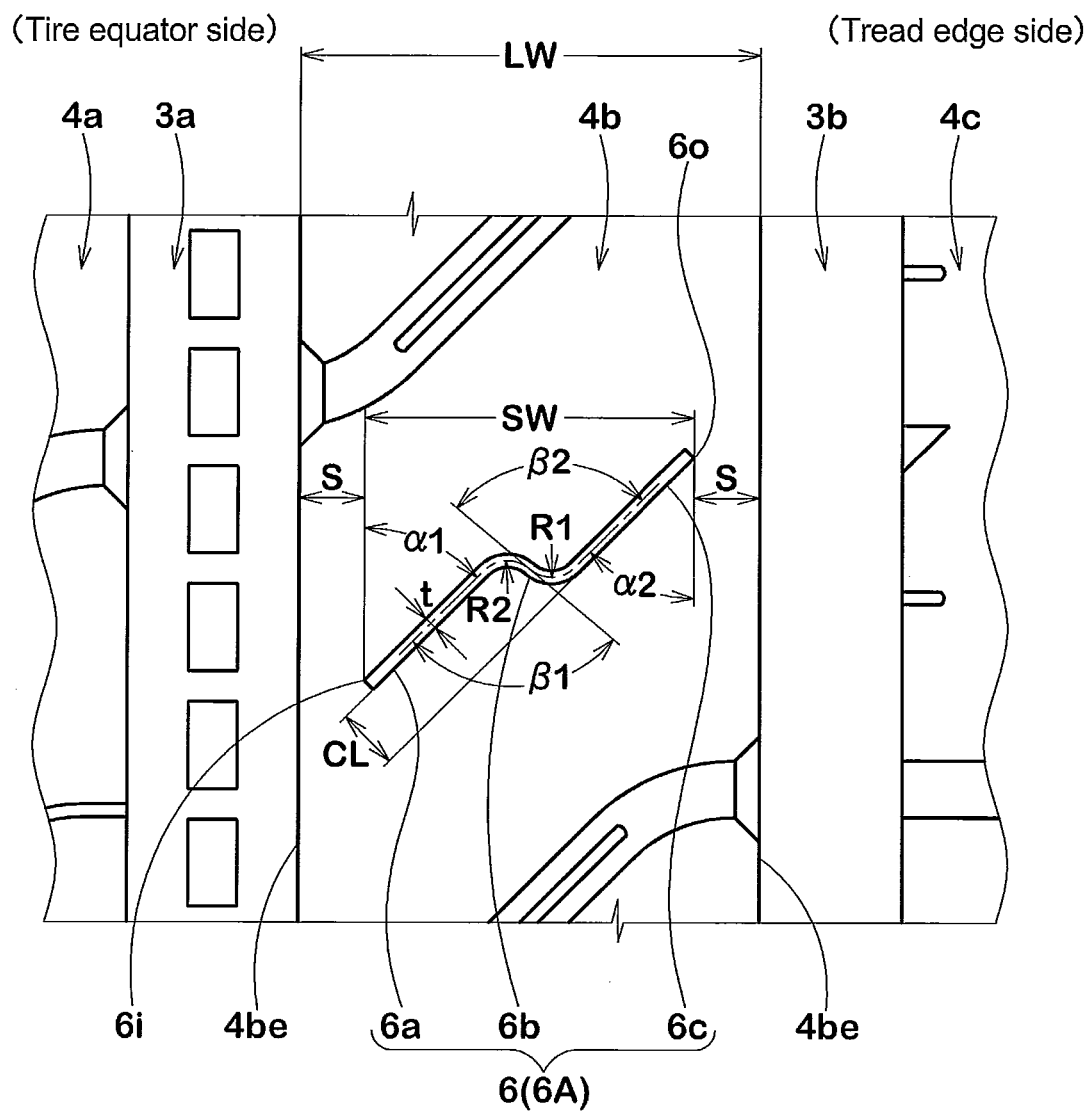
FIG. 4 is an enlarged partial view of the right-side middle rib showing a closed-end sipe.

Each of the middle ribs 4b is provided with a plurality of sipes 6 arranged at intervals in the tire circumferential direction. FIG. 3 shows one sipe 6 formed in the left-side middle rib 4b. FIG. 4 shows one sipe 6 formed in the right-side middle rib 4b.

Each of the sipes 6 extends continuously from its axially inner end 6i on the tire equator side to its axially outer end 6o on the ground contact edge E side, and terminates within the middle rib 4b without connecting to any groove. Namely, the sipe 6 is a closed-end sipe which is relatively hard to open even when subjected to external force in comparison with an open-end sipe whose both ends are opened towards the adjacent main grooves. As a result, the rib punching wear beginning at the sipes can be prevented.

The closed-end sipe 6 comprises:
an axially inner segment 6a extending from the axially inner end 6i towards the axially outer end 6o while inclining at an inclination angle $\alpha 1$ with respect to the tire circumferential direction;
an axially outer segment 6c extending from the axially outer end 6o towards the axially inner end 6i while inclining at an inclination angle $\alpha 2$ with respect to the tire circumferential direction in the substantially same direction as the axially inner segment 6a; and
a middle segment 6b extending between the axially outer end of the axially inner segment 6a and the axially inner end of the axially outer segment 6c while inclining in a direction crosswise to the axially inner and outer segments 6a and 6c.

The angle $\alpha 1$ and angle $\alpha 2$ are set in a range of not less than 30 degrees, preferably not less than 40 degrees, but not more than 60 degrees, preferably not more than 50 degrees with respect to the tire circumferential direction.

In this embodiment, the axially inner segment 6a and outer segment 6c have substantially same lengths, and the middle segment 6b is shorter than these segments 6a and 6c.

The length of the middle segment 6b is about ¼ to ½ of the lengths of the inner segment 6a and outer segment 6c.

The angle $\alpha 2$ of the axially outer segment 6c is substantially same as the angle $\alpha 1$ of the axially inner segment 6a, and thereby the axially inner segment 6a and outer segment 6c are substantially parallel with each other.

In the embodiment shown in FIGS. 1, 3 and 4, the axially inner segment 6a is substantially straight and inclined down to the left; the middle segment 6b is inclined oppositely thereto, namely, down to the right; and the axially outer segment 6c is substantially straight and again inclined down to the left.

Figure 5:
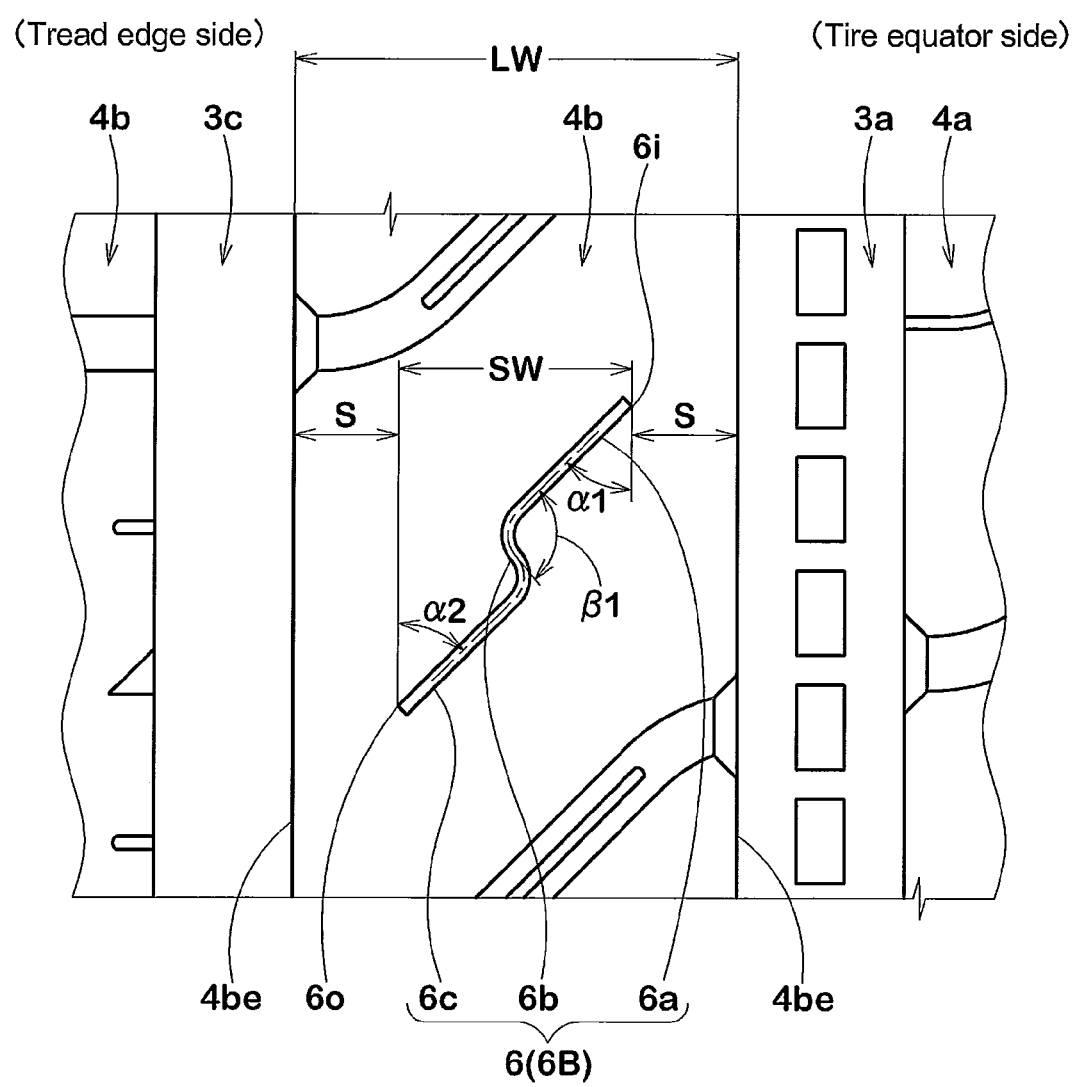
FIG. 5 is an enlarged plan view of another example of the closed-end sipe.

FIG. 5 shows another example of the closed-end sipe 6 (hereinafter sipe 6B), wherein the middle segment 6b extends from the axially outer end of the axially inner segment 6a towards the tire equator (namely, axially inwards) whereas in the former example shown in FIGS. 3 and 4 (hereinafter sipe 6A), the middle segment 6b extends from the axially outer end of the axially inner segment 6a towards the tread edge (namely, axially outwards).

By the way, it is most effectual for improving the wet braking performance to form a sipe extending parallel with the tire axial direction. However, due to the shearing force during running, such axial sipe is largely opened and closed repeatedly. Accordingly, so called heel-and-toe wear is very liable to occur. As a result, if the middle ribs 4b are provided with such axial sipes, there is a tendency that a rib punching wear is caused in an early stage of tread life. Further, disadvantageously, the axial sipes can not increase the frictional force against the road surface when the tire is subjected to a side force during cornering.

On the other hand, it is most effectual for improving the cornering performance on wet roads to form a sipe extending parallel with the tire circumferential direction. However, due to the shearing force during cornering, the circumferential sipe is largely opened and closed repeatedly. Accordingly, so called feather edge wear is liable to occur. As a result, if the middle ribs 4b are provided with such circumferential sipes, there is a tendency that a rib punching wear is caused starting from such uneven wear. Further, disadvantageously, the circumferential sipes can not increase the frictional force against the road surface during braking or accelerating.

In contrast, in the case of the present invention, the sipe 6 has an axial component which can increase the frictional force during braking and accelerating, and an circumferential component which can increase the frictional force during cornering. As a result, the wet performance is improved in a well-balanced manner.

Further, in the case of the sipe 6A, when the tire is subjected to a shearing force in the tire axial direction, the wall surfaces of the middle segment 6b contact with each other, and thereby the amount of the opening is reduced. As a result, uneven wear is reduced to prevent the occurrence of rib punching wear therefrom.

In the case of the sipe 6B, when the tire is subjected to a shearing force in the tire circumferential direction, the wall surfaces of the middle segment 6b contact with each other, and thereby the amount of the opening is reduced. As a result, uneven wear is reduced to prevent the occurrence of rib punching wear therefrom.

As explained above, owing to the middle segment 6b, the sipe 6 is prevented from being opened largely.

In order to obtain advantage from the sipe 6A and sipe 6B, both types of sipes 6A and 6B can be provided in each of the middle ribs 4b, for example, such that the sipes 6A and 6B are alternately arranged in the tire circumferential direction.

Besides, it is also possible to use the sipes 6B only in the tread pattern shown in FIG. 1 instead of the sipes 6A.

It is necessary that the angle $\beta 1$ between the axially inner segment 6a and middle segment 6b and the angle $\beta 2$ between the axially outer segment 6c middle segment 6b are not less than 90 degrees and not more than 110 degrees.

If less than 90 degrees, rib punching wear is liable to begin at the corner between the axially inner segment 6a and middle segment 6b or the corner between the axially outer segment 6c and middle segment 6b.

If more than 110 degrees, a heel-and-toe wear spreading into the rib punching wear is liable to occur along the edges of the middle segment 6b.

Preferably, the angle $\beta 1$ and angle $\beta 2$ are not less than 95 degrees, and not more than 105 degrees.

Further, it is necessary that the axial length SW of the sipe 6 measured from the axially inner end 6i to the axially outer end 6o of the sipe 6 is in a range of from 0.50 to 0.90 times the axial width LW of the middle rib 4b.

If less than 0.50 times the width LW, wet performance can not be fully improved. If more than 0.90 times the width LW, the middle ribs 4b are decreased in the rigidity and rib punching wear becomes liable to occur.

Preferably, the axial length SW of the sipe 6 is set in a range of not less than 0.5 times, more preferably not less than 0.6 times, but not more than 0.9 times, more preferably not more than 0.8 times the axial width LW of the middle rib 4b.

In order to prevent breakage of the tread rubber occurring at the sipes' ends, it is preferable that the axially inner end 6i and axially outer end 6o of the sipe 6 are spaced apart from the adjacent side edges 4be of the middle rib 4b towards the center of the rib by a distance S of at least 0.05 times of the axial width LW of the middle rib.

Further, it is preferable that the midpoint of the length SW of the sipe coincides with the midpoint of the axial width LW of the middle rib 4b.

Furthermore, it is preferable that the length CL of the middle segment 6b is set in a range of not less than 0.10 times, more preferably not less than 0.15 times, but not more than 0.30 times, more preferably not more than 0.25 times the axial width LW of the middle rib in order to prevent uneven wear starting from the sipe.

In this embodiment, the sipe 6 includes: an arc segment 6r between the middle segment 6b and inner segment 6a; and an arc segment 6r between the middle segment 6b and outer segment 6c. The radius of curvature R1, R2 of the arc segment 6r is preferably set in a range of not less than 1.0 mm, more preferably not less than 2.0 mm, but not more than 5.0 mm, more preferably not more than 4.0 mm.

The arc segments 6r smoothly connect the segments 6a, 6b and 6c, and prevent breaking of tread rubber at the corners of the sipe 6. Further, local wear or flaw causing the rib punching wear can be prevented.

It is however possible to connect the middle segment 6b to the axially inner segment 6a and outer segment 6 at angles.

The above-mentioned length CL of the middle segment 6b is basically defined as the distance measured along the center line GCL of the sipe 6 from its one end to the other end.

Figure 6:
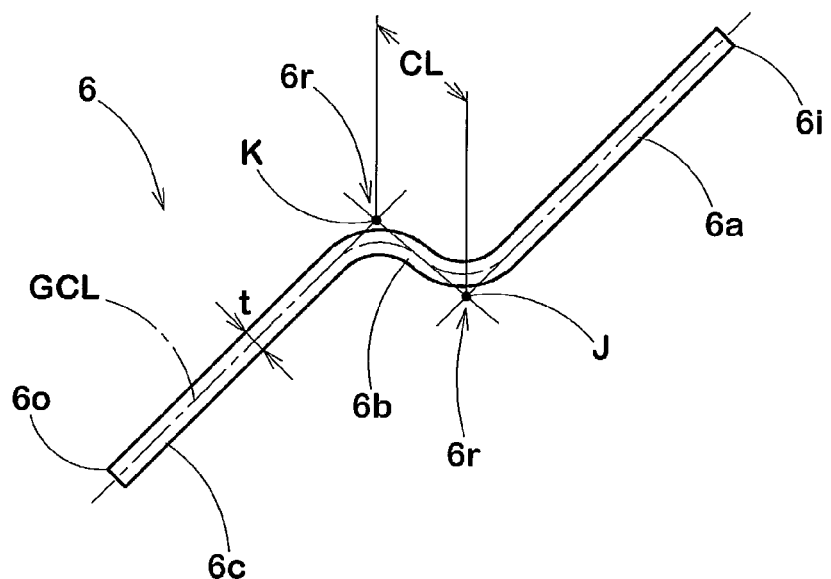
FIG. 6 is an enlarged plan view of the closed-end sipe.

But, in the case that the above-mentioned arc segment 6r is provided on one of or each of the corner between the middle segment 6b and inner segment 6a and the corner between the middle segment 6b and outer segment 6c, as shown in FIG. 6, an intersecting point J, K of an extension of a straight part of the center line GCL of the middle segment 6b and an extension of a straight part of the center line GCL of the axially inner segment 6a or outer segment 6c can be used as the end of the middle segment 6b to determine the length CL.

The thickness t of the sipe 6 is set in a range of from 0.3 to 1.0 mm. In this embodiment, the thickness t of the sipe 6 is constant, but it can be varied within the above range.

For example, it is possible to decrease the thickness t as the depth of the sipe increases. In this case, it becomes easier to pull out sipping blades (provided on the inner surface of a tire vulcanizing mold to form sipe) from the vulcanized tire tread rubber.

Figure 7:
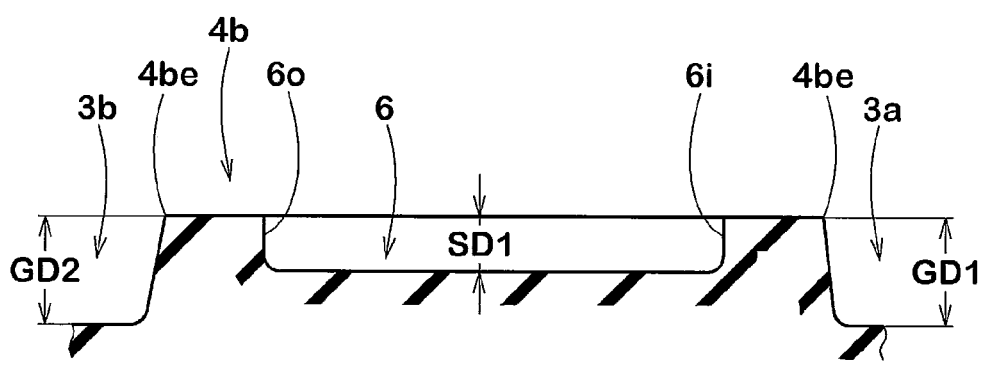
FIG. 7 is a cross sectional view of the middle rib taken along the closed-end sipe.

FIG. 7 is a cross sectional view of the middle rib 4b taken along the widthwise center line of the sipe 6.

The depth SD1 of the sipe 6 is set in a range of not less than 50%, preferably not less than 60%, but not more than 90%, preferably not more than 80% of the depth of the main groove 3 (in this case, the depth GD1 of the center main groove 3a).

If less than 50%, there is a possibility that wet performance deteriorates as the tread wear progresses. If more than 90%, there is a possibility that cracks occur at the bottom of the sipes and the durability of the rib 4b is deteriorated.

Figure 8:
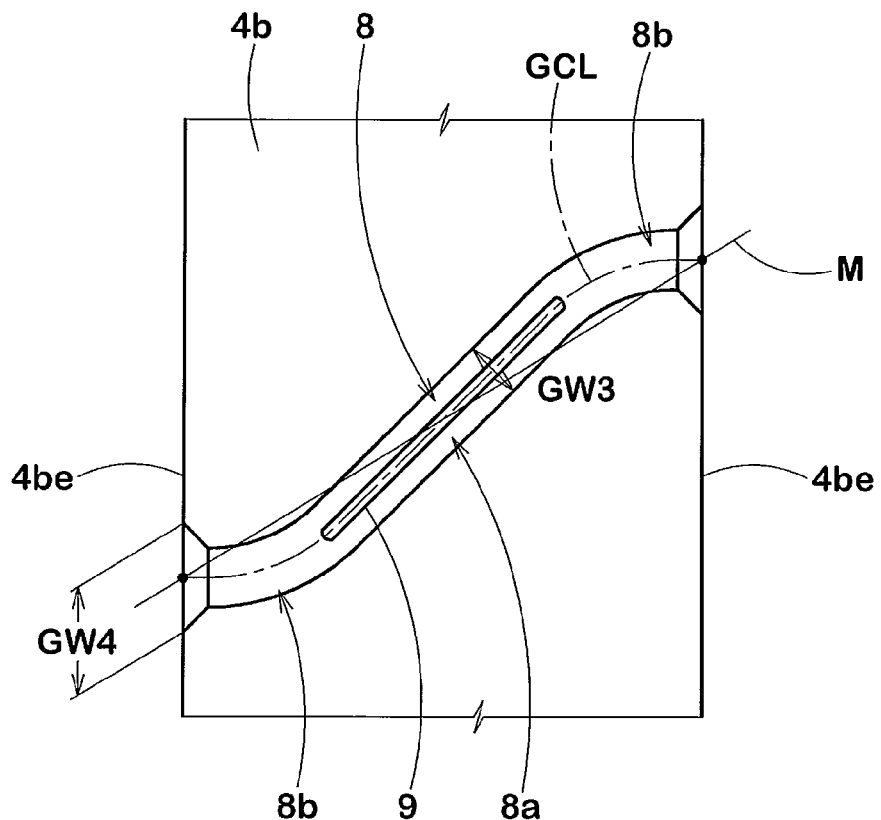
FIG. 8 is an enlarged plan view of a shallow axial groove provided on the middle ribs (and the center rib).

In this embodiment, each of the middle ribs 4b is provided between every two of the circumferentially adjacent sipes 6 with a shallow axial groove 8 as shown in FIG. 8.

Figure 9:
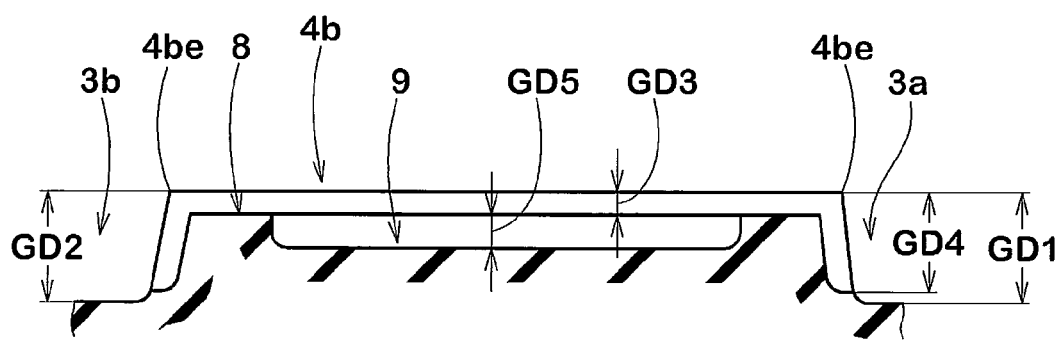
FIG. 9 is a cross sectional view of the middle rib (center rib) taken along the shallow axial groove.

The cross sectional view of the middle rib 4b taken along the widthwise center line of the shallow axial groove 8 is shown in FIG. 9.

The shallow axial groove 8 is wider than the sipe 6, but shallower than the sipe 6.

The both ends of the shallow axial groove 8 are connected to the main grooves 3 on both sides of the rib 4b.

The shallow axial grooves 8 can appropriately decrease the rigidity of the middle rib 4b so as to reduce a variation of the ground pressure distribution of the rib occurring when the sipe 6 is twisted or opened and thus it can help to reduce uneven wear.

The shallow axial groove 8 is inclined such that a straight line M drawn between the ends of the widthwise center line GCS of the shallow axial groove 8 is inclined in the same direction as the axially inner segment 6a of the sipe 6.

As a result, the rigidity of a part of the middle rib 4b between the circumferentially adjacent sipe 6 and shallow axial groove 8 is uniformed to prevent the occurrence of uneven wear.

The shallow axial groove 8 in this example comprises:
a central major part 8a which is substantially straight and substantially parallel with the axially inner segment 6a of the sipe 6; and
an end part 8b which is positioned on each side of the central major part 8a to open to the adjacent main groove 3 and whose widthwise center line has a variable inclination angle with respect to the tire axial direction which angle continuously decreases towards the main groove 3 down to almost zero (more specifically not more than 5 degrees).

Such configuration of the shallow axial groove 8 can further uniform the rigidity of the above-mentioned part.

The end parts 8b can prevent the formation of acute corners between the shallow axial groove 8 and the rib's side edges 4be, therefore, tearing off of the rubber at the rib's side edges and uneven wear can be prevented, and the prevention of the rib punching wear can be further assured.

The width GW3 of the central major part 8a of the shallow axial groove 8 is preferably set in a range of not less than 2.0 mm, more preferably not less than 3.0 mm, but not more than 6.0 mm, more preferably not more than 5.0 mm.

The depth GD3 of the central major part 8a of the shallow axial groove 8 is preferably set in a range of not less than 1.0 mm, more preferably not less than 2.0 mm, but not more than 5.0 mm, more preferably not more than 4.0 mm, still more preferably not more than 3.0 mm.

If the width GW3 is less than 2.0 mm and/or the depth GD3 is less than 1.0 mm, the drainage and the wet performance deteriorate. If the width GW3 is more than 6.0 mm and/or the depth GD3 is more than 5.0 mm, the rigidity of the rib relatively largely decreases near the shallow axial groove which tends to cause rib punching wear.

The axial length of the central major part 8a that is the axial distance between its ends measured in the tire axial direction is set in a range of 0.6 to 1.0 times the axial length SW of the sipe 6.

Near the side edge 4be of the middle rib 4b, the end part 8b is flared towards the main groove 3 so that the groove width and depth are increased. The maximum GW4 of the groove width is preferably not less than 5.0 mm, more preferably not less than 6.0 mm, but not more than 9.0 mm, more preferably not more than 8.0 mm. The maximum GD4 of the groove depth is preferably not less than 70% of the depth (GD1 or GD2) of the main groove 3.

Further, as shown in FIG. 8 and FIG. 9, the groove bottom of the shallow axial groove 8 is provided with a sipe 9 extending along the groove center line GCL of the shallow axial groove 8.

The sipe 9 is substantially straight and is formed only in the central major part 8a, and not formed in the end parts 8b. The depth GD5 of the sipe 9 is preferably set in a range of from 2.0 to 4.0 mm from the bottom of the shallow axial groove 8.

The thickness of the sipe 9 is 0.3 to 1.0 mm.

The sipe 9 is not reached to the end parts 8b, therefore, the sipe 9 is a closed-end sipe.

Such closed-end sipe 9 can improve wet performance while preventing the occurrence of cracks at the ends thereof.

In this embodiment, the above-mentioned center rib 4a is provided with the shallow axial grooves 8 and sipes 9 same as those in the middle ribs 4b.

As best shown in FIG. 1, all of the shallow axial grooves 8 provided in the tread portion are arranged as if they extend continuously from one of the middle ribs 4b to the other middle rib 4b, crossing the main grooves 3a.

More specifically, with respect to each of the center main grooves 3a, the open ends of the end parts 8b on one side of the main groove 3a are oppositely opposed to the open ends of the end parts 8b on the other side of the main groove 3s, respectively.

Such arrangement of the shallow axial grooves 8 can facilitate to lead the water existing between the tread and road surface towards one oblique direction as the tire rotates and as a result, the drainage performance can be increased.

In this embodiment, the center rib 4a is further provided with an open-end sipe 10 between every two of the circumferentially adjacent shallow axial grooves 8 in order to effectively improve the wet performance.

The sipes 10 has a thickness of 0.3 to 1.0 mm and extend parallel with the shallow axial groove 8, therefore the sipe 10 comprises: a major segment 10a extending substantially straight; and an end segment 10b on each side of the major segment 10a and opened to the adjacent main groove 3, wherein the end segment 10b has a variable inclination angle which continuously decreases towards the main groove 3 down to substantially zero, namely, not more than 5 degrees with respect to the tire axial direction.

Such configuration of the sipe 10 can prevent tearing off of the rubber at the sipe ends, while maintaining drainage performance because the end segment 10b of the sipe 10 is connected to the main groove 3 substantially at right angle, and the rigidity of the rib in the vicinity of the sipe end can be prevented from decreasing. As a result, the tearing off can be effectively prevented.

In this embodiment, the shoulder ribs 4c are each provided near the tread edge E with a narrow circumferential groove 13 extending straight in the tire circumferential direction. The narrow circumferential groove 13 is disposed at a position of about ¼ of the width LW3 of the shoulder rib 4c from the tread edge E. The depth of the narrow circumferential groove 13 is substantially same as the depth of the main grooves 3, but the width is about ⅕ to ¼ of the width of the shoulder main grooves 3b.

In the shoulder ribs 4c, there is no axial groove extending across the entire width of the rib 4c.

Comparison Tests

Heavy duty tires of size 11R22.5 (wheel rim size 22.5× 8.25) were made and tested as follows.

The test tires had identical internal structures and same tread patterns as shown in FIG. 1 except for the sipes formed in the middle ribs. The specifications of the sipes ate shown in Table 1. Basic specifications common to all the test tire are as follows.
Ground contacting width TW: 210 mm
Center main grooves
width GW1: 11.0 mm
Depth GD1: 9.8 mm
Shoulder main grooves
Width GW2: 9.0 mm
Depth GD2: 9.8 mm
Center rib's width LW1: 28 mm
Middle ribs' width LW2: 28 mm
Shoulder ribs' width LW3: 43 mm
Shallow axial grooves
Width GW3 of central major part: 4.0 mm
Depth GD3 of central major part: 3.0 mm
maximum width GW4 of end part: 7.0 mm
Maximum depth GD4 of end part: 8.8 mm
Depth GD5 of sipe in bottom: 3.0 mm
Wet Braking Performance Test:

The test tires were mounted on eight wheels of a two-axle trailer tracked by a 2DD tractor head and run on a wet asphalt road at a speed of 60 km/h and a hard brake application was made to cause wheel lockup. The running distance (braking distance) from the wheel lockup to the stop was measured.

As the test results, the reciprocal number of the running distance is indicated in Table 1 by an index based on comparative example 1 being 100. Thus, the larger the value, the better the wet braking performance.

Wet Side-Skid Performance Test:

The test car was run along a 100 meter radius circle on an asphalt road partially provided with a 5 mm depth 20 m long water pool, and the lateral acceleration (lateral G) during running in the water pool was measured, gradually increasing the speed entering into the water pool, to obtain the average for the speed range of from 50 to 80 km/h.

The results are indicated in table 1 by an index based on comparative example 1 being 100, wherein the larger is better.

Uneven Wear Resistance Test:

After the test car run on the asphalt road in a tire test course for 10,000 km, the amount of wear of the middle rib was measured at both side edges of each of the right and left middle ribs at six circumferential positions, and the average value of these 24 measuring points was obtained.

In Table 1, the reciprocal number of the average value is indicated by an index based on comparative example 1 being 100. Thus, the larger the value, the better the uneven wear resistance.

TABLE 1

| Tire | Ref. 1 | Ref. 2 | Ref. 3 | Ex. 1 | Ex. 2 | Ex. 3 |
|---|---|---|---|---|---|---|
| angle α1 (degrees) | 20 | 70 | 80 | 45 | 30 | 60 |
| angle α2 (degrees) | 20 | 70 | 80 | 45 | 30 | 60 |
| angle β1 (degrees) | 90 | 90 | 90 | 90 | 90 | 90 |
| angle β2 (degrees) | 90 | 90 | 90 | 90 | 90 | 90 |
| SW/LW ratio | 0.68 | 0.68 | 0.68 | 0.68 | 0.68 | 0.68 |
| CL/LW ratio | 0.14 | 0.14 | 0.14 | 0.14 | 0.14 | 0.14 |
| radius R1 (mm) | 3.0 | 3.0 | 3.0 | 3.0 | 3.0 | 3.0 |
| radius R2 (mm) | 3.0 | 3.0 | 3.0 | 3.0 | 3.0 | 3.0 |
| Wet braking performance | 100 | 105 | 110 | 120 | 110 | 130 |
| Wet side-skid performance | 100 | 105 | 95 | 120 | 110 | 130 |
| Uneven wear resistance | 100 | 95 | 90 | 120 | 130 | 110 |

| Tire | Ex. 4 | Ex. 5 | Ex. 6 | Ex. 7 | Ex. 8 | Ex. 9 | Ex. 10 |
|---|---|---|---|---|---|---|---|
| angle α1 (degrees) | 45 | 45 | 45 | 45 | 45 | 45 | 45 |
| angle α2 (degrees) | 45 | 45 | 45 | 45 | 45 | 45 | 45 |
| angle β1 (degrees) | 100 | 110 | 90 | 90 | 90 | 90 | 90 |
| angle β2 (degrees) | 100 | 110 | 90 | 90 | 90 | 90 | 90 |
| SW/LW ratio | 0.68 | 0.68 | 0.5 | 0.9 | 0.68 | 0.68 | 0.68 |
| CL/LW ratio | 0.14 | 0.14 | 0.14 | 0.14 | 0.10 | 0.20 | 0.30 |
| radius R1 (mm) | 3.0 | 3.0 | 3.0 | 3.0 | 3.0 | 3.0 | 3.0 |
| radius R2 (mm) | 3.0 | 3.0 | 3.0 | 3.0 | 3.0 | 3.0 | 3.0 |
| Wet braking performance | 120 | 120 | 110 | 120 | 110 | 120 | 130 |
| Wet side-skid performance | 120 | 120 | 110 | 120 | 110 | 120 | 130 |
| Uneven wear resistance | 110 | 105 | 110 | 105 | 120 | 110 | 105 |

From the test results, it was confirmed that the resistance to uneven wear or rib punching wear and wet performance can be effectively improved.

The invention claimed is:

1. A heavy duty tire comprising:
a tread portion provided with four straight main grooves extending continuously in the tire circumferential direction so as to form a center rib extending along the tire equator, a pair of axially outermost shoulder ribs, and a pair of middle ribs between the center rib and shoulder ribs, each said middle rib being provided with a plurality of closed-end sipes whose ends are terminated within the middle rib and arranged at intervals in the tire circumferential direction, the closed-end sipes each comprising:
an axially inner segment extending axially outwardly from the axially inner end of the closed-end sipe while inclining at an angle of from 30 to 60 degrees with respect to the tire circumferential direction, an axially outer segment extending axially inwardly from the axially outer end of the closed-end sipe while inclining at an angle of from 30 to 60 degrees with respect to the tire circumferential direction in the same inclining direction as the axially inner segment, and a middle segment extending between an axially outer end of the axially inner segment and an axially inner end of the axially outer segment, while inclining in a direction crosswise to the axially inner and outer segments, wherein the angle β1 between the axially inner segment and middle segment is not less than 90 degrees and not more than 110 degrees, the angle β2 between the axially outer segment and middle segment is not less than 90 degrees and not more than 110 degrees, and an axial length SW of the closed-end sipe measured from the axially inner end to the axially outer end thereof is not less than 0.50 times but not more than 0.90 times the axial width LW of the middle rib, wherein each said middle rib is provided between every two of the circumferentially adjacent closed-end sipes with a shallow axial groove having a depth of from 1.0 to 3.0 mm, both ends of the shallow axial groove are respectively opened to the main grooves adjacent to the middle rib, the shallow axial groove is inclined such that a straight line drawn between both ends of a widthwise center line of the shallow axial groove is inclined in the same direction as the axially inner segments of the closed-end sipes, and the shallow axial groove comprises:
a central major part extending parallel with the axially inner segment of the closed-end sipe; and an end part which is disposed on each side of the central major part and whose widthwise center line has a variable inclination angle with respect to the tire axial direction which continuously decreases towards its open end.

2. The heavy duty tire according to claim 1, wherein a length CL of the middle segment is not less than 0.10 times but not more than 0.30 times the axial width LW of the middle rib.

3. The heavy duty tire according to claim 1 or 2, wherein said middle segment extends axially outwardly from the axially outer end of the axially inner segment.

4. The heavy duty tire according to claim 1 or 2, wherein said middle segment extends axially inwardly from the axially outer end of the axially inner segment.

5. The heavy duty tire according to claim 1 or 2, wherein said plurality of closed-end sipes include:
a closed-end sipe whose middle segment extends axially outwardly from the axially outer end of the axially inner segment; and
a closed-end sipe whose middle segment extends axially inwardly from the axially outer end of the axially inner segment.

6. The heavy duty tire according to claim 1, wherein at least one of the axially inner segment and the axially outer segment is connected to the middle segment through an arc segment having a radius of curvature of 1.0 to 5.0 mm.

7. The heavy duty tire according to claim 1, wherein the shallow axial groove is provided in the bottom thereof with a sipe extending along the widthwise center line of the shallow axial groove.

\* \* \* \* \*